(12) United States Patent
Emanuel et al.

(10) Patent No.: US 10,955,314 B1
(45) Date of Patent: Mar. 23, 2021

(54) ONE-HANDED SURFACE SAMPLING DEVICE

(71) Applicant: U.S. Army Edgewood Chemical and Biological Command, APG, MD (US)

(72) Inventors: Peter A. Emanuel, Abingdon, MD (US); Calvin C. Chue, Baltimore, MD (US); Daniel J. Angelini, Bel Air, MD (US); Kristy L. Williams, Belcamp, MD (US); Aleksandr E Miklos, Baldwin, MD (US); Kyle D. Ford, Conowingo, MD (US)

(73) Assignee: The United States of America as Represented by the Secretary of The Army, Washington, DC (US)

( * ) Notice: Subject to any disclaimer, the term of this patent is extended or adjusted under 35 U.S.C. 154(b) by 1074 days.

(21) Appl. No.: 14/919,362

(22) Filed: Oct. 21, 2015

Related U.S. Application Data

(60) Provisional application No. 62/100,262, filed on Jan. 6, 2015.

(51) Int. Cl.
*G01N 1/02* (2006.01)

(52) U.S. Cl.
CPC ......... *G01N 1/02* (2013.01); *G01N 2001/028* (2013.01)

(58) Field of Classification Search
CPC ....... G01N 2001/022; G01N 2001/024; G01N 2001/025; G01N 2001/027; G01N 2001/028
USPC ...................................................... 73/864.51
See application file for complete search history.

(56) References Cited

U.S. PATENT DOCUMENTS

| 4,461,387 | A | * | 7/1984 | Belokin, Jr. | A47F 5/04 211/194 |
| 4,573,590 | A | * | 3/1986 | Ellis | A47F 5/0068 211/118 |
| 4,788,733 | A | * | 12/1988 | Lerner | A41D 19/0075 15/104.94 |
| 4,938,368 | A | * | 7/1990 | Sharman | A47F 5/0876 211/57.1 |
| 4,959,881 | A | * | 10/1990 | Murray | A47L 13/18 15/104.94 |
| 5,079,792 | A | * | 1/1992 | D'Haen | C09K 3/32 15/227 |
| 5,301,806 | A | * | 4/1994 | Olson | A41D 19/0068 15/227 |
| 5,473,789 | A | * | 12/1995 | Oster | A47L 13/19 15/104.94 |
| 5,736,351 | A | * | 4/1998 | Miller | C12Q 1/04 435/287.9 |
| 5,806,668 | A | * | 9/1998 | Bixby | A41D 19/0068 15/227 |
| 5,833,058 | A | * | 11/1998 | Mabry | B65D 81/264 206/204 |

(Continued)

FOREIGN PATENT DOCUMENTS

GB 2461741 A * 1/2010 ......... A61B 10/0096

*Primary Examiner* — Alexander A Mercado
(74) *Attorney, Agent, or Firm* — Ulysses John Biffoni

(57) ABSTRACT

A sampling apparatus and method for collecting chemical and biological samples is disclosed and claimed. A surface sampling apparatus is designed to simplify taking successive environmental samples using one hand. In addition, the sampling bag used with the apparatus serves as both safety barrier and transport bag and is prepared with multiple sampling surfaces and in wet or dry formats.

11 Claims, 3 Drawing Sheets

(56) References Cited

U.S. PATENT DOCUMENTS

| | | | | |
|---|---|---|---|---|
| 5,938,012 | A | * | 8/1999 | Yeager .................... A24F 25/02 206/205 |
| 6,539,549 | B1 | * | 4/2003 | Peters, Jr. .......... A41D 19/0075 15/227 |
| 6,613,576 | B1 | * | 9/2003 | Rodacy .................. B01L 3/502 422/408 |
| 6,745,894 | B2 | * | 6/2004 | Dean ................. A41D 19/0075 206/204 |
| 7,410,612 | B1 | * | 8/2008 | Carrington ............. G01N 31/22 422/531 |
| 2003/0113906 | A1 | * | 6/2003 | Sangha ............. A61B 10/0051 435/287.2 |
| 2013/0137186 | A1 | * | 5/2013 | Rutter ................ A61B 10/0045 436/169 |
| 2016/0202149 | A1 | * | 7/2016 | Thomson ................ B01L 3/505 73/864.71 |
| 2016/0296211 | A1 | * | 10/2016 | Luffman ............ A61B 10/0096 |
| 2017/0074754 | A1 | * | 3/2017 | Sjolen ...................... G01N 1/02 |

\* cited by examiner

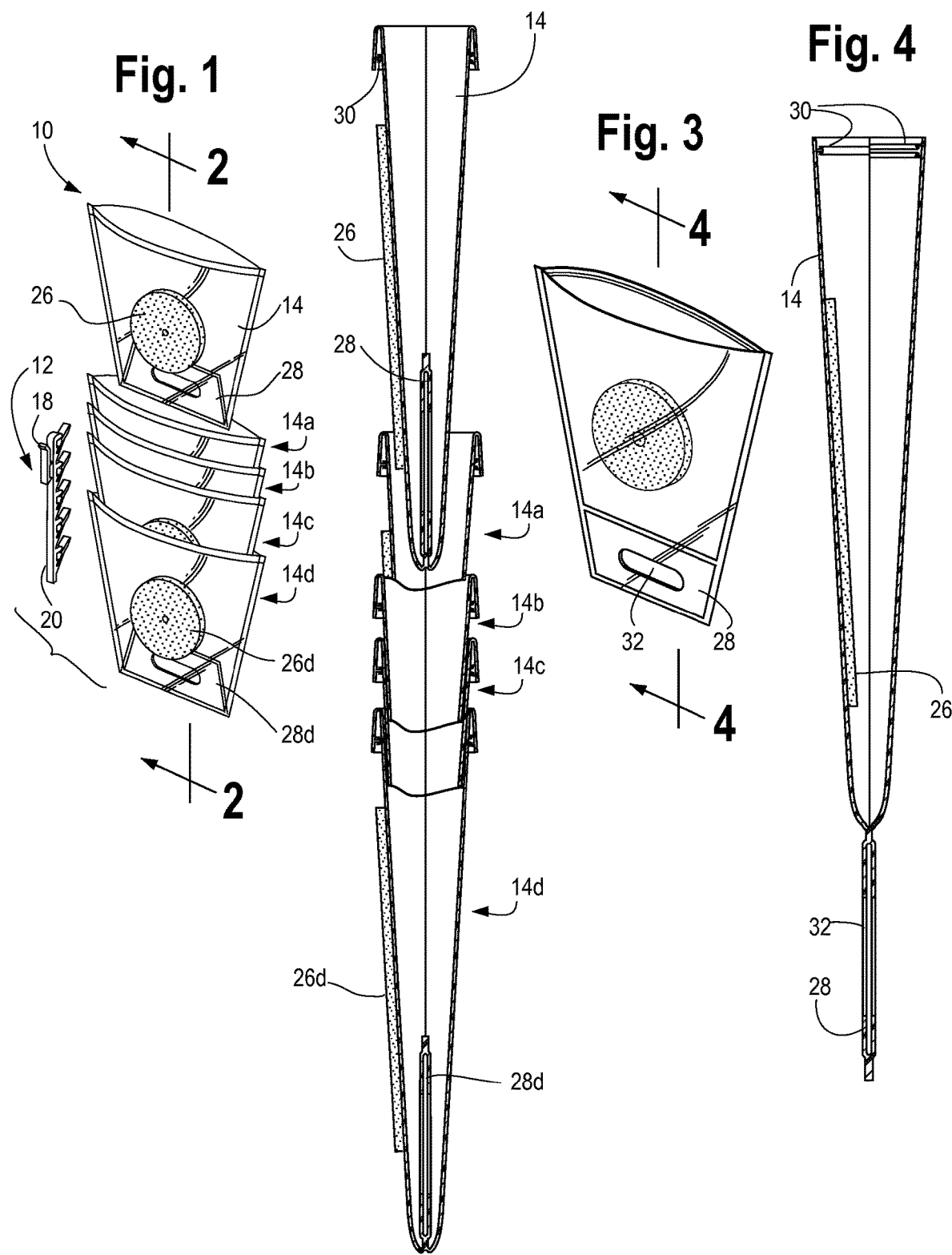

ONE-HANDED SURFACE SAMPLING DEVICE

CROSS-REFERENCE TO RELATED APPLICATIONS

This application claims the benefit of U.S. provisional patent application No. 62/100,262, filed Jan. 6, 2015.

GOVERNMENT INTEREST

The invention described herein may be manufactured, used, and/or licensed by or for the United States Government.

FIELD OF THE INVENTION

The invention relates generally to a surface sampling apparatus and more particularly to a device that can be used to take successive samples with one hand.

BACKGROUND

There are several biological sampling kits that are designed to acquire and safely transport biological specimens. Many of the items in these kits are individually packaged and require both hands for optimal use. Also, due to the fact that many of these items must be packaged individually, the user will generate a large amount of waste that will need to be managed during the course of a sampling mission.

Prior art sampling technology employs sponges, swabs, and wipes. These devices are typically individually packaged and require a labeled secondary container for transport to the laboratory for analysis. This outer container must be decontaminated prior to exiting the hot zone. This process involves several steps and generates waste at each step. Also, these procedures must be completed while wearing full personal protective equipment (PPE).

One prior art sponge-based biological sampling kit is the BiSKit® manufactured by QuickSilver Analytics, Inc. Although the device is designed to be used in a hazardous environment while dressed in mission oriented protective posture (MOPP) gear, there are multiple parts to this sampling kit. These parts include the BiSKit® unit (with aquafoam sponge), buffer, dropper lid, transport bag, port cover, as well as a wet & dry sampling instruction card and a chain-of-custody form. Once sampling is completed, the unit must be stored in a separate bag or container for decontamination and transport to the laboratory for analysis.

The 3M® Sponge-Stick is another example of a sponge-based sampling collection device. This device is a cellulose sponge attached to the end of a plastic stick that is detachable once a sample is collected. The 3M® Sponge-Stick is available in either wet or dry formats. Unlike the BiSKit®, the 3M® Sponge-Stick is packaged in its secondary/transport container, however, it is still a two handed operation. One hand is required to hold the actual device and one hand is required to hold the secondary container.

Two examples of prior art swab-based sampling kits are the S2P® Swab Sampling Powder kit and the Small Area Sampling (SAS®) kit, both manufactured by QuickSilver Analytics, Inc. Both of these kits include several different items including sterile swabs, buffer solution, sample bags, and sample collection sheets.

Other swab-based sampling kits include a Sterile Surface Swab kit manufactured by SKC, Inc that contains 10 sterile surface swabs in transport tubes as well as 10 plastic templates. Similarly, Copan Diagnostics Inc. produces the Swab Rinse Kits (SRK) that contain pre-wetted swabs in storage tubes and surface sampling templates. Like the sponge-based devices, these swab-based sample collection kits have multiple items that will consistently generate waste over the course of a sampling mission.

Many existing sampling kits are repurposed with medical swabs intended to take throat cultures, are wrapped or sealed in plastic wrappers that are difficult to handle with thick gloves, or have many bottles and tubes inside foil wrapped packages that need to be laid out on a sterile sampling mat to organize taking a single sample.

Thus, there is a need for chemical or biological sampling technologies that generates less waste and provides for fast, one-handed operation by personal who may be wearing protective clothing.

SUMMARY

An apparatus according to the invention is a surface sampling apparatus that is designed to simplify taking successive environmental samples using one hand. In addition, the sampling bag serves as both safety barrier and transport bag and is prepared with multiple sampling surfaces and in wet or dry formats.

The invention in one implementation encompasses a sampling apparatus. The apparatus has an elongate bracket further comprising a plurality of clips and a plurality of sample bags, each having a body having opposing flat sides forming a front and a back, said front and back flat sides sealed on three edges and open on a top edge, said body having an inside surface and an outside surface, a resealable rim around the top edge of the body on the inside surface and a sample pad mounted on the front flat side of the inside surface of the body; prior to use for taking samples, each bag of said plurality of said sample bags is inverted so that sample pad is on the outside and the resealable rim is retained within a clip on the elongate bracket such that front flat side of the body is closest to the elongate bracket and the plurality of sample bags are nested inside each other.

In an embodiment, the elongate bracket further has a rear elongate leg attached to an upper end of the elongate bracket on the opposite side of the elongate bracket from the plurality of clips for removeably attaching the sampling apparatus to a user.

In a further embodiment, the sampling apparatus includes between approximately 5 and 10 sample bags.

In another embodiment, the invention encompasses a sampling device having a body having opposing flat sides forming a front and a back, said front and back flat sides sealed on three edges and open on a top edge, said body having an inside surface and an outside surface, a resealable rim around the top edge of the body and a sample pad mounted on the front flat side of the inside surface of the body.

The invention in a further implementation encompasses a method of taking samples using a sampling apparatus, the sampling apparatus including an elongate bracket having a plurality of clips; a plurality of sample bags, each having a body having opposing flat sides forming a front and a back, said front and back flat sides sealed on three edges and open on a top edge, said body having an inside surface and an outside surface; a resealable rim around the top edge of the body on the inside surface; and a sample pad mounted on the front flat side of the inside surface of the body; prior to use for taking samples, each bag of said plurality of said sample bags is inverted so that sample pad is on the outside and the resealable rim is retained within a clip on the elongate bracket such that front flat side of the body is closest to the elongate bracket and the plurality of sample bags are nested inside each other and the method of taking samples includes the steps of inserting a hand into an innermost sample bag of said nested plurality of sample bags; removing the bag from the nested set by pulling the resealable rim from the clip; taking a sample of a surface with the sample pad; inverting the sample bag; and sealing the resealable rim to enclose the sample pad inside the bag.

In a further embodiment, the step of inverting the sample bag includes the step of grasping a tab mounted on the lower edge of the outside surface of the body.

In any of the above embodiments, the sampling bags include a tab mounted on the lower edge of the outside surface of the body for use in inverting the sample bag after a sample is taken.

In any of the above embodiments, each of the plurality of sample bags are inverted such that the sample pad is on the outside and the tab is on the inside, prior to being attached to the elongate bracket.

In any of the above embodiments, the sample pad is mounted approximately half way between the resealable rim and a lower edge opposite the top edge.

In any of the above embodiments, the sampling pad is a tacky adhesive pad.

In any of the above embodiments, the sampling pad is made from cellulose, microfoam or melamine foam.

In any of the above embodiments, the sampling pad is made from cotton, gelatins, static charged fabrics, or microfiber cloth.

DESCRIPTION OF THE DRAWINGS

Features of example implementations of the invention will become apparent from the description, the claims, and the accompanying drawings in which:

FIG. 1 depicts a sampling kit according to the present invention.

FIG. 2 depicts a cross sectional side view of the sampling kit of FIG. 1.

FIG. 3 depicts an individual sampling bag.

FIG. 4 depicts a cross sectional side view of the sampling bag of FIG. 3.

DETAILED DESCRIPTION

Figure 5A:
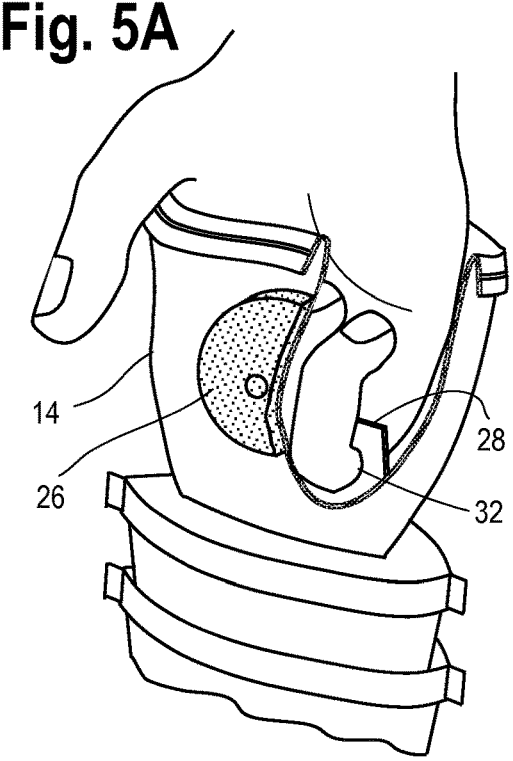
FIG. 5A depicts a user removing a sampling bag from the sampling kit of FIG. 1.

If used and unless otherwise stated, the terms "upper," "lower," "front," "back," "over," "under," and similar such terms are not to be construed as limiting the invention to a particular orientation. Instead, these terms are used only on a relative basis.

In an embodiment, the invention is a surface sampling device that is designed to simplify taking successive environmental samples using one hand. The device consists of a semi-flexible clip structure holding a nested set of sampling bags. Each sample bag is designed to take a single sample. A plurality of bags are nested together in a set on the clip structure, then secured to a user.

A sampling kit 10 is shown in FIG. 1. Bracket 12 includes a first elongated leg 20 for holding a series of nested bags in clips, as shown in more detail in FIG. 6. A second, shorter elongated leg 18 is used to attach bracket 12 to a user's clothing, belt, strap, bag, etc. An innermost sample bag 14 is attached to bracket 12 at the top of leg 20. One or more additional sample bags 14a, 14b, 14c and 14d are nested below innermost bag 14. In an embodiment, outside bag 14d is the same as sample bag 14. In an alternative, the sample bags are enclosed in a package made of plastic or cardboard (not shown) that may be provided with a lid which is removed prior to initial use of sampling kit 10.

Sample pad 26 is attached to sample bag 14 at a location that would be at approximately the middle of a user's hand when inserted in the bag. As shown in FIG. 1, sample pad 26 is attached to the outside of bag 14 as it appears in this figure, on the side of bag 14 that is next to bracket 12, however, it could be attached to the side of bag 14 that is opposite bracket 12 as well. Sample pad 26 could take a variety of forms depending on the type of sample being collected. Pull tab 28 will be discussed in more detail below.

A cross sectional side view of sampling kit 10 along line 2 is shown in FIG. 2. Common reference numbers indicate the same elements of the sampling kit. Sample bag 14 includes a resealable edge 30 along the top of the bag opposite pull tab 28. Before attaching sample bags to bracket 12 of FIG. 1, they are turned so sample pad 26 is on the outside of each bag and pull tab 28 is on the inside of bag 14. Resealable edge 30 of each bag is folded down before being attached to bracket 12 as shown. Sample bag 14 is nested inside sample bag 14a, and continuing on through sample bag 14d as explained above for FIG. 1, all of bags 14a-14d include a sample pad 26 and a pull tab 28 but they are only shown for sample bag 14d. The sample bags could also be enclosed in a package.

A representative sample bag 14 is shown in more detail in FIG. 3. In this view, sample bag 14 is inverted from how it is depicted in FIG. 2, as explained in more detail in connection with FIGS. 5A-5D. Resealable edge 30 is oriented so that opposing edges interlock with each other, sample pad 26 is now inside sample bag 14 and pull tab 28 is outside. In an embodiment, resealable edge 30 is a zipper type geometry that can be sealed by pinching the two halves together and sliding one's fingers along the top to complete the seal, but any preferred mechanism for securely sealing bag 14 after use may be provided. Pull tab 28 includes an opening 32 used to help in grasping pull tab 28.

FIG. 4 depicts a cross sectional side view along line 4 of the sample bag 14 of FIG. 3. In an embodiment, pull tab 28 is integrally formed from the same material as sample bag 14 by heat sealing. In an alternative embodiment, it could be replaced with a pull cord to accomplish the same function of inverting bag 14 or any other means by which a lower edge of the bag can be grasped and manipulated.

A method of using sampling kit 10 is shown in FIGS. 5A-5D. Prior to use the sample bags are oriented so that the resealable edge 30 and sample pad 26 are on the outside of the bag and pull tab 28 is on the inside of the bag as shown in FIG. 1. The top of each sample bag 14 is folded over to the outside prior to attaching to bracket 12 (not shown). A user removes the top or innermost bag from the sampling kit 10 as shown in FIG. 5A. When using sampling kit 10, a user inserts a hand into the inner most remaining sample bag of the nested set 14-14d with the palm of the hand facing sample pad 26. The user pulls bag 14, for example, out of its associated clip (shown in more detail in FIG. 6) on bracket 12. The user then removes the sample bag from the set so that the user's hand is encased in a single sample bag and ready to take a sample using a sampling pad attached to the outside of bag 14.

Figure 5B:
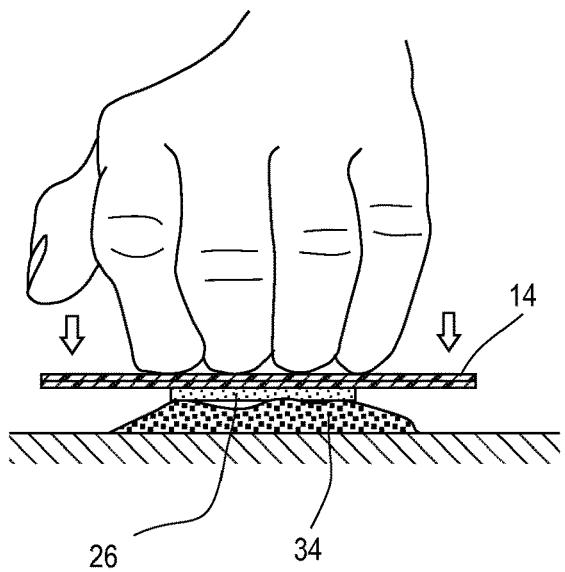
FIG. 5B depicts a user taking a sample.
Figure 5C:
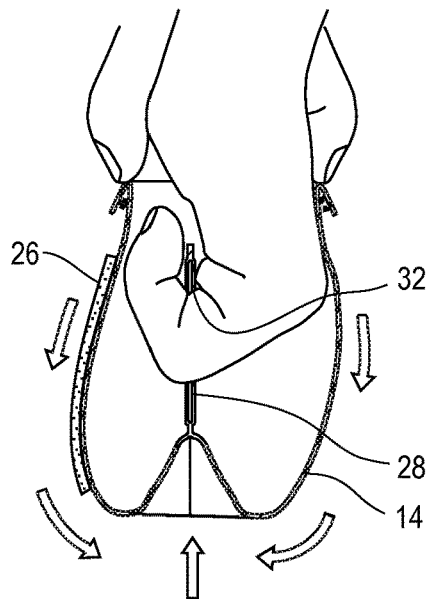
FIG. 5C depicts a user inverting a sample bag after taking a sample.
Figure 5D:
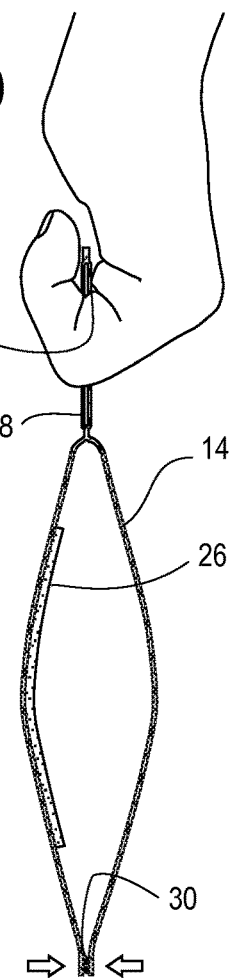
FIG. 5D depicts a sample bag after sampling and prepared for transport.

Once a user has removed the inner most sample bag from the nested set, a sample is taken by rubbing sampling pad 26 against the surface 34 to be sampled as shown in FIG. 5B. Once sampling is complete, the user grasps pull tab 28 inside the bag, while holding resealable edge 30 of the bag as shown in FIG. 5C. The user inverts sample bag 14 by holding resealable edge 30 and by pulling on the pull tab 28, thus trapping the sampling pad on the inside of the inverted bag as shown in FIG. 5D.

Figure 6:
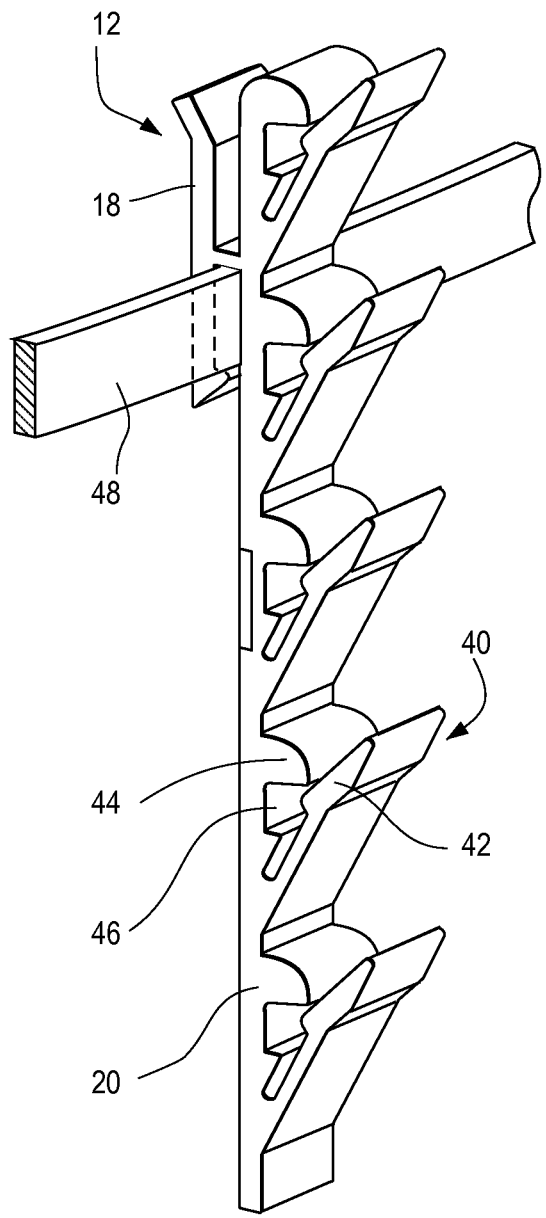
FIG. 6 depicts a more detailed view of a bracket used with the sampling kit of FIG. 1

A more detailed view of bracket 12 is shown in FIG. 6. Leg 20 includes a plurality of attachment clips 40 which are used to hold the nested set of sample bags 14-14d. Although FIG. 6 shows five attachment clips 40, any preferred number may be used. Each attachment clip 40 includes front portion 42 and back portion 44, which hold resealable edge 30 of a sample bag in slot 46. When a user removes a sample bag, edge 30 of a sample bag 14 (not shown) is pulled through a gap between front portion 42 and back portion 44 to remove the bag from clip 40 on leg 20 of bracket 12. Although a specific geometry has been shown for front portion 42, back portion 44 and slot 46, one of ordinary skill in the art would understand that any shape could be used as long as it accomplished the function of holding a sample bag in place until it was ready for use. Bags are removed one at a time until the clip structure is empty. Elongated leg 18 is used to flexibly and removeably attach bracket 12 to a user's clothing or other convenient location, for example, belt 48.

Figure 7:
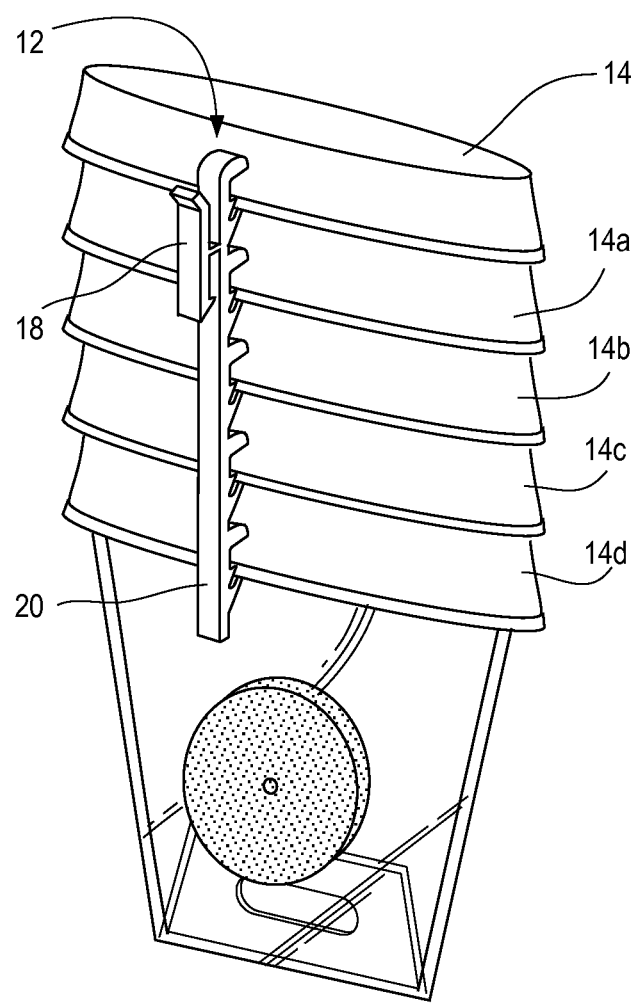
FIG. 7 depicts a further view of the sampling kit of FIG. 1.

FIG. 7 depicts a complete sampling kit 10 with sample bags 14-14d attached to bracket 12 prior to its use in collecting samples.

Sampling kit 10 allows the sampling bags 14-14d to act as a safety barrier to facilitate the taking of a surface sample. After use, each bag is then turned inside out so that it can now serve as a transport bag for the sample. The final configuration is an inverted sample bag that has the used sample pad sealed within the bag. The user can now insert his/her hand into the next sampling bag and repeat.

At least one advantage of sampling kit 10 is one handed sampling in quick succession wherein each sampling bag serves as both safety barrier and transport bag, resulting in less waste generation. Further, sampling kit 10 may be used in hazardous environments by personnel in MOPP gear. Sampling kit 10 is set up prior to entering a hot zone in such a way as to facilitate sampling with a single hand. It also reduces time to conduct a surface sampling operation in comparison to the prior art. Reduction in sampling time will be significant to the user because the PPE required for most sampling missions can be hot and uncomfortable when worn for a significant amount of time. Sampling kit 10 eliminates the generation of wrappers during sampling, and the uncapping and ripping open of packages once inside a hot zone. Sampling kit 10 may be clipped onto a user's normally worn PPE. Bracket 12 also allows sampling kit 10 to be placed in such a way as to allow covert/low visibility acquisition of samples under circumstances where a user does not want his/her purpose to be readily apparent.

Numerous alternatives to the invention exist. Any type of substance may be tested using the device of the invention. A large number of different sampling pads could be used, for example, cotton, gelatins, tacky adhesive (with or without a peelable cover), static charged fabrics, cellulose/sponge, microfoam, melamine foam, and microfiber cloth.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant an that various modifications, additions, substitutions, and the like can be made without departing from the spirit of the invention and these are therefore considered to be within the scope of the invention as defined in the following claims.

What is claimed is:

1. A sampling apparatus, comprising:
    an elongate bracket-having a plurality of clips;
    a plurality of sample bags, each bag comprising:
        a body having opposing flat sides forming a front and a back, said front and back flat sides sealed on three edges and open on a top edge, said body having an inside surface and an outside surface;
        a resealable rim around the top edge of the body on the inside surface;
        a sample pad mounted on the front flat side of the inside surface of the body; and
        a tab mounted on a lower edge of the outside surface of the body; and
    wherein each bag of said plurality of sample bags is turned inside out so that the sample pad is on the outside and the tab is on the inside and the resealable rim is retained within a clip on the elongate bracket such that front flat side of the body is closest to the elongate bracket and the plurality of sample bags are nested inside each other.

2. The sampling apparatus of claim 1, wherein the elongate bracket further comprises a rear elongate leg attached to an upper end of the elongate bracket on the opposite side of the elongate bracket from the plurality of clips, wherein said rear elongate leg is adapted for removeably attaching the sampling apparatus to a user.

3. The sampling apparatus of claim 1, wherein the plurality of sample bags further comprises between approximately 5 and 10 sample bags.

4. The sampling apparatus of claim 1, wherein the sampling pad further comprises a tacky adhesive pad.

5. The sampling apparatus of claim 1, wherein the sampling pad further comprises cellulose, microfoam or melamine foam.

6. The sampling apparatus of claim 1, wherein the sampling pad further comprises cotton, gelatins, static charged fabrics, or microfiber cloth.

7. A method of taking samples using a sampling apparatus, said sampling apparatus comprising:
    an elongate bracket having a plurality of clips;
    a plurality of sample bags, each bag comprising a body having opposing flat sides forming a front and a back, said front and back flat sides sealed on three edges and open on a top edge, said body having an inside surface and an outside surface; a resealable rim around the top edge of the body on the inside surface; a sample pad mounted on the front flat side of the inside surface of the body; and a tab mounted on the lower edge of the outside surface of the body relative to the sample pad; and
    wherein each bag of said plurality of sample bags is turned inside out so that the sample pad is on the outside and the tab is on the inside and the resealable rim is retained within a clip on the elongate bracket such that the front flat side of the body is closest to the elongate bracket and the plurality of sample bags are nested inside each other;

the method comprising:

inserting a hand into an innermost sample bag of said nested plurality of sample bags;

removing the bag from the nested set by pulling the resealable rim from the clip;

taking a sample from a surface with the sample pad;

inverting the sample bag; and sealing the resealable rim to enclose the sample pad inside the bag.

8. The method of claim 7, further comprising the step of removeably attaching the sampling apparatus to a user with a rear elongate leg attached to an upper end of the elongate bracket on the opposite side of the elongate bracket from the plurality of clips.

9. The method of claim 7, wherein the sampling pad further comprises a tacky adhesive pad.

10. The method of claim 7, wherein the sampling pad further comprises cellulose, microfoam or melamine foam.

11. The method of claim 7, wherein the sampling pad further comprises cotton, gelatins, static charged fabrics, or microfiber cloth.

\* \* \* \* \*